US012629966B2

(12) United States Patent
Becker et al.

(10) Patent No.: US 12,629,966 B2
(45) Date of Patent: May 19, 2026

(54) COMMERCIAL TRUCK TIRE

(71) Applicant: The Goodyear Tire & Rubber Company, Akron, OH (US)

(72) Inventors: Derek John Becker, Munroe Falls, OH (US); David Michael Pribula, Alliance, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 18/319,710

(22) Filed: May 18, 2023

(65) Prior Publication Data

US 2024/0383286 A1 Nov. 21, 2024

(51) Int. Cl.
*B60C 11/13* (2006.01)
*B60C 11/04* (2006.01)

(52) U.S. Cl.
CPC .......... *B60C 11/1369* (2013.01); *B60C 11/04* (2013.01); *B60C 2200/06* (2013.01)

(58) Field of Classification Search
CPC ............. B60C 11/1369; B60C 11/0323; B60C 11/1281; B60C 11/125; B60C 2011/1338
See application file for complete search history.

(56) References Cited

U.S. PATENT DOCUMENTS 4,230,512 A * 10/1980 Makino ............... B60C 11/0309
152/209.27
2011/0277898 A1* 11/2011 Barraud ............... B60C 11/032
152/209.18

FOREIGN PATENT DOCUMENTS

| EP | 2570272 | B1 | | 5/2016 | |
|----|---------|----|--|--------|--|
| EP | 4303037 | A1 | | 1/2024 | |
| JP | 10250317 | A | | 9/1998 | |
| JP | 2002219909 | A | * | 8/2002 | |
| KR | 20060058922 | A | | 6/2006 | |
| WO | WO-2017174928 | A1 | * | 10/2017 | ......... B60C 11/1307 |

OTHER PUBLICATIONS

English machine translation of JP-2002219909-A. (Year: 2002).*
English machine translation of WO2017174928 (Year: 2017).*
European Search report for U.S. Appl. No. 24/174,793 mailed Nov. 12, 2024.

* cited by examiner

*Primary Examiner* — Robert C Dye
(74) *Attorney, Agent, or Firm* — June E. Rickey

(57) ABSTRACT
A tire comprising a tire tread having a tread region comprising a first and second rib, wherein the first and second ribs are separated by a groove; at least one tie-bar element disposed within the groove, and the tie-bar block element having opposed sidewalls separated by a radially extending groove, wherein the radially extending groove tapers from a first width to a second width, wherein the second width is wider than the first width.

5 Claims, 3 Drawing Sheets

COMMERCIAL TRUCK TIRE

FIELD OF THE INVENTION

The invention relates generally to vehicle tires and, more specifically, to a tread pattern for steer tires intended for commercial truck application.

BACKGROUND OF THE INVENTION

Commercial truck tires are required to provide a suitable level of wet and snow performance while rolling resistance performance and fuel mileage efficiency achieved by the tire is maintained. Moreover, it is desired that such tires provide a high level of cornering stiffness and resistance to tread wear in order to prolong the useful life of the tire tread. Accordingly, there is a need for a commercial truck steer tire having a tread pattern that functionally meets such competing objectives to thereby provide the user with acceptable overall tire performance.

SUMMARY OF THE INVENTION

According to a first aspect of the invention, a tire having a tire tread is described, wherein the tread has a first and second rib, wherein the first and second ribs are separated by a groove; wherein at least one tie-bar element disposed within the groove. The tie-bar block element has opposed sidewalls separated by a radially extending groove, wherein the radially extending groove tapers from a first width to a second width, wherein the second width is wider than the first width.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
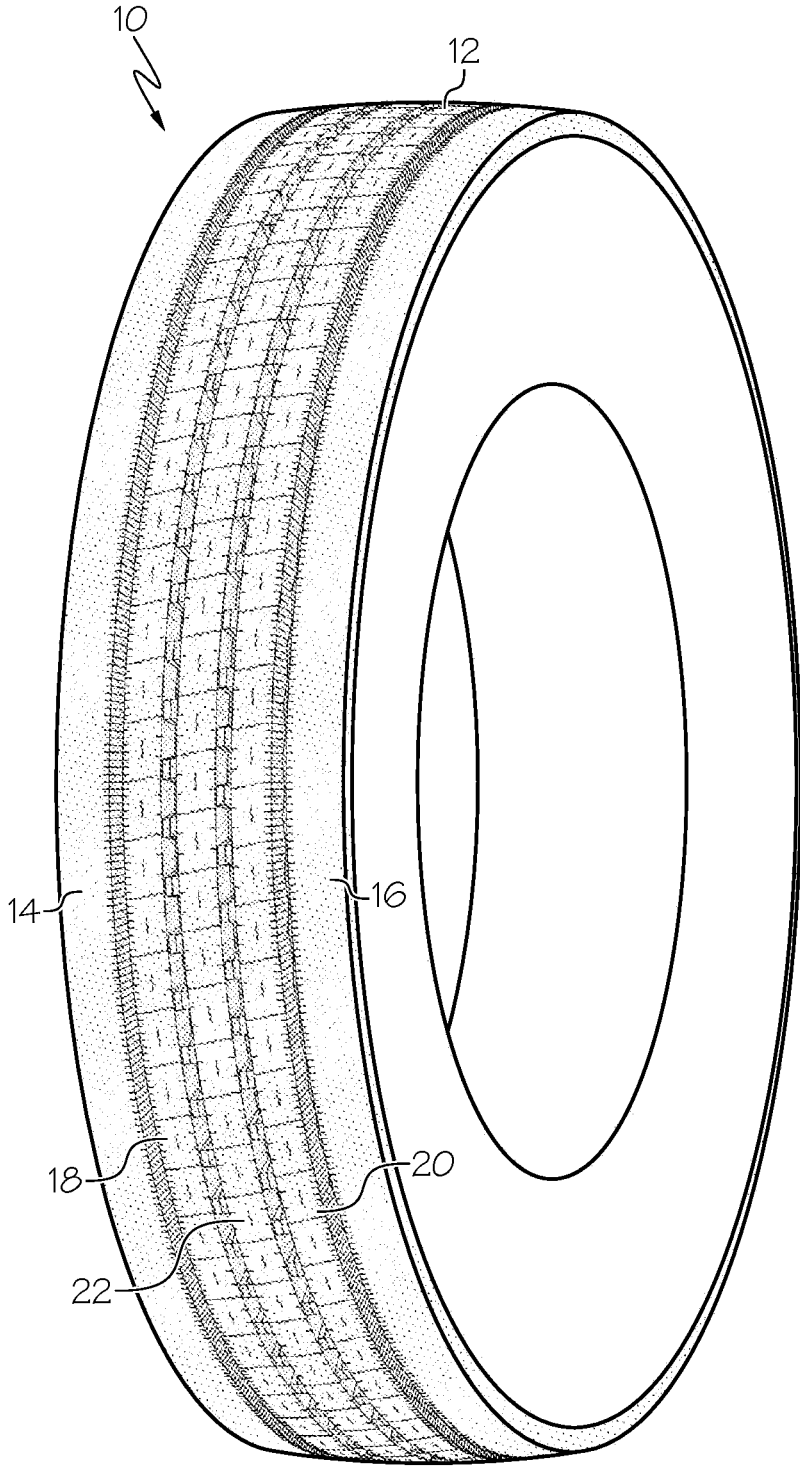
FIG. 1 is a front perspective view of a tire of the present invention.
Figure 2:
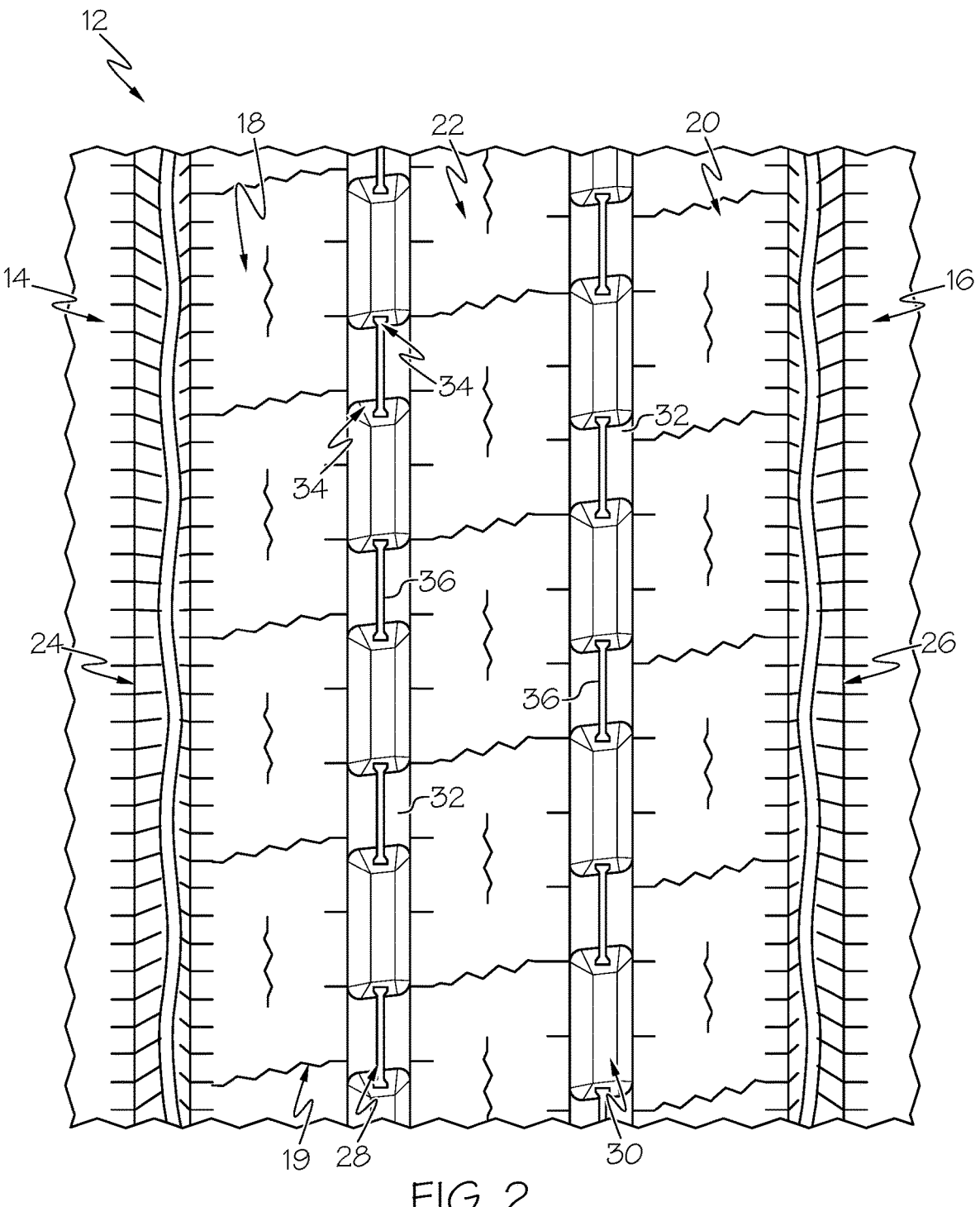
FIG. 2 is a front view of a portion of the tread of the tire of FIG. 1.

With reference to FIGS. 1 and 2, a first embodiment of a tire 10 of the present invention is provided having a circumferentially continuous tread region 12. The tread 12 includes a center rib 22, a first and second shoulder rib 14, 16 disposed on each side of the center rib 22, and a first and second intermediate rib 18, 20 disposed on opposite sides of the center rib 22. An equatorial centerplane divides the tread 12 into two symmetrical halves. A pair of circumferentially continuous intermediate grooves 28, 30 are located between the center rib 22 and a respective intermediate rib. A pair of circumferentially continuous shoulder grooves 24, 26 that separate respectively, the intermediate ribs 18, 20 from the shoulder ribs 14, 16.

Figure 3:
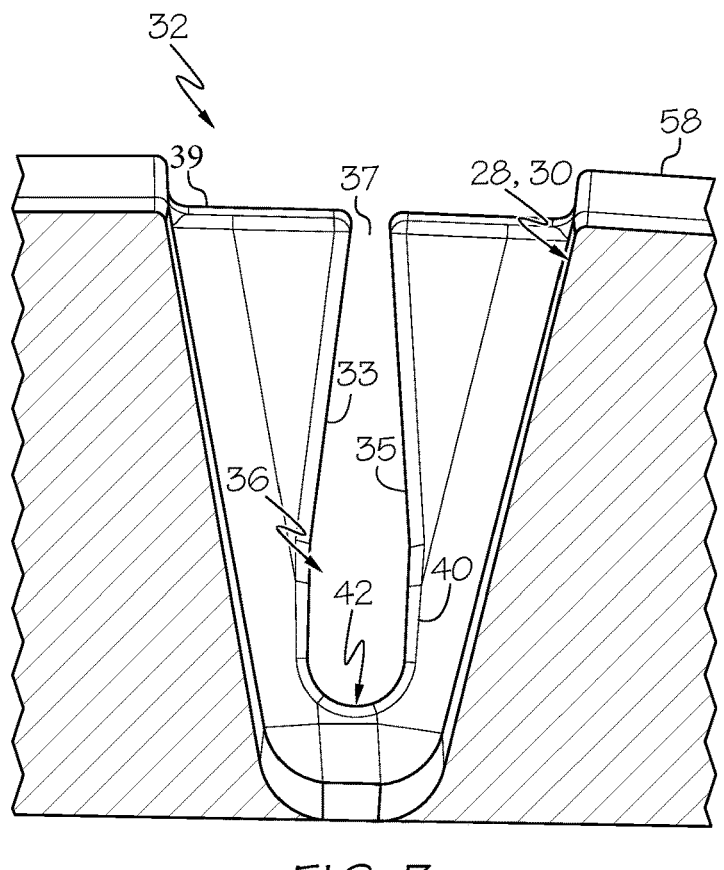
FIG. 3 is a section view through a tie bar of the tire tread region.
Figure 4:
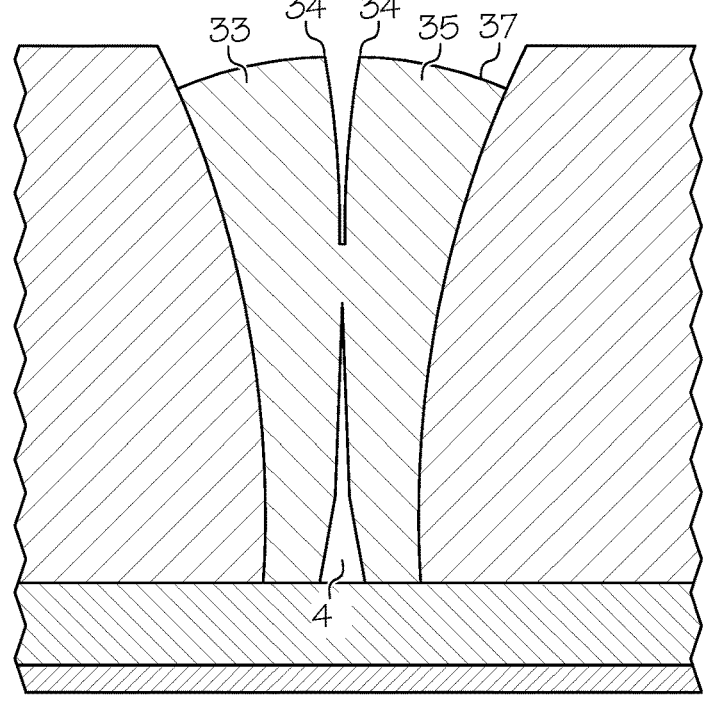
FIG. 4 is a section view of the tie bar under load in the footprint.

Situated within at least one groove is a plurality of discrete, spaced apart tie-bar elements 32. Each of the tie bar elements 32 preferably have a generally quadrilateral shape with an elongate dimension in a circumferential direction, and bounded along longitudinal sides by adjacent ribs and along transverse sides by end walls 34. The end walls 34 of each tie bar are preferably angled, and are more preferably angled in a direction away from each other. The tie-bar elements 32 are spaced apart by a circumferential spacing lying within a preferred range of 15 mm to 45 mm. As best shown in FIG. 3, each tie-bar element 32 has parallel and opposed sidewalls 33,35 which extend laterally towards each other from the adjacent ribs. The opposed sidewalls are separated by a radially inward groove 36. The radially inward groove 36 has an upper portion 37 with the narrowest portion of the groove width at the outer surface of the tread, wherein the radially inward groove 36 tapers laterally outward, increasing in axial thickness from a narrow portion to a wider lower portion 40. In the lower portion 40, the sidewalls have a constant width apart, and terminate in a generally circular bottom portion 42, dimensioned having a diametric width W2 within a preferred range of 2 mm to 4 mm, and lies at the base of the tie-bar block element. The channel 4 extends circumferentially through the tie-bar block element and provides a conduit for snow and rain management and remains open during operation (rolling through the footprint).

As will be noted from FIG. 2, the tie-bar opposed sidewalls 33,35 are recessed radially inward from a radially outward tread surface 58. Thus, in the new condition, the upper surface 37 of each tie-bar block element 32 does not constitute a part of the rolling tire footprint. After sufficient wear of the tread has occurred, the surface 39 of each block element 32 is exposed and becomes part of the rolling tire footprint. Alternatively, if desired, the tie-bar elements 32 may be constructed as the same height as the outer tread surface.

The width of the intermediate grooves W is within a preferred range of 9 mm to 15 mm. The width of groove 36 in the upper portion has width spacing W1 within a preferred range of 0.5 mm to 1.5 mm. The width W1 of the spacing is preselected to enable the tie-bar opposed sidewalls to engage each other and thereby to close in a rolling tire footprint. The channel 4 remains open.

It will be appreciated that the grooves 28, 30 have a width W at a radially outward tread surface 58 and a groove depth D lying within a preferred range of 12 mm to 18 mm. The tie-bar elements 32 are recessed within a respective groove 28, 30 and have a block element height H lying within a preferred range of 11 mm to 17 mm.

The tread configuration reduces shoulder wear and irregular wear due to the rib width within a five rib design. The center rib 22 and intermediate ribs 18, 20 are relatively narrow, within a preferred range of 50 to 80 percent relative to the relatively wider shoulder ribs 14, 16, having a width within a preferred range of 40 mm to 60 mm. Consequently, the cornering stiffness provided by the tread is increased and frictional energy reduced relative to five rib tires having a conventionally uniform rib design. As a result mileage increase provided by the subject tread 12 is increased.

The arrays of tie-bar elements 32 within the grooves 28, 30 make the tread more rigid and helps to increase the cornering stiffness and also enhances better snow and wet performance through the tire life. The tie-bar elements 32 stiffen the tread for better cornering and mileage performance. The tie-bar block elements 32, recessed within respective grooves, are not in contact with a road surface when the tire is new but establish contact after the tire tread wears. As the tie-bar block elements 32 come into contact with road surface, the edges 34 at the opposed walls 33,35 become additional edges in the footprint area. The channel 4 of each tie-bar block element constitutes an air and water conduit for directing air and water through the block elements. Allowing air to pass through the elements eliminates trapped air and thereby reduces the noise level of the tread. Also, by allowing the passage of water through the channels 4, potential aquaplaning is eliminated.

In the five rib construction of the tread region 12, the net-to-gross ratio defined as net contact area (area enclosing the pattern of the tire tread in contact with a flat surface excluding the area of grooves or other voids at a definite load and inflation) to gross contact area (area enclosing the pattern of the tire tread in contact with a flat surface including the area of grooves or other voids at a definite load and inflation) is increased. The addition of the tie-bar block elements 32 increases the lateral stiffness of the tread without impacting the circumferential stiffness of the tread.

When the tie-bar block element 32 enters the footprint of the rolling tire, the groove 36 closes in the axial direction, bringing the opposed sidewalls of the upper portion of the tie-bar together in touching relationship. As a result, the lateral stiffness of the tread within the footprint is increased when the tie-bar is within the footprint, whereby cornering stiffness is enhanced and frictional energy reduced. When a tie-bar leaves the footprint of the rolling tire, the tie-bar separates in the axial direction and the groove 36 is reopened to its original width. The tie-bar elements 32 thus help improve mileage performance of the tire by enhancing stiffness and reducing treadwear from lateral loads on the tread. The wider shoulder rib configuration further reduces the shoulder wear phenomena. As the tread wears through use, the tie-bar block elements 32 become road contacting elements and the edges defining the tie-bars additional contacting edges for enhanced traction. The array of tie-bar block elements accordingly do not obstruct the functional performance of the groove in which the block elements are situated, and fluid such as rain or snow melt is able to traverse the circumferential groove unobstructed by the array of tie-bar block elements. The tire tread thereby provides high mileage and durability desired by the user.

Variations in the present invention are possible in light of the description of it provided herein. While the tire has been described as having five ribs, the tire of the present invention is not limited to said construction. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:
1. A tire comprising:
   a tire tread having a tread region comprising a first and second rib, wherein the first and second ribs are separated by a first groove;

wherein the tire tread has a plurality of tie-bar elements disposed within the first groove and separated by a circumferential spacing, wherein the tie-bar elements have first and second opposed sidewalls separated by a radially extending groove, wherein the tie bar elements have a radially inner portion wherein the first and second opposed sidewalls are spaced apart at a constant width, and wherein the tie bar elements have a radially outer portion wherein the first and second opposed sidewalls are continuously tapered so that the radially extending groove narrows from the radially inner portion to an upper surface of the tire bar elements.

2. The tire of claim 1 wherein the upper surface of the tire bar element are recessed relative to the upper surface of the tread.

3. The tire of claim 1, wherein the radially extending groove includes a radially lower channel.

4. The tire of claim 3, wherein the radially lower channel remains open during operation.

5. A tire comprising:

a tire tread having a tread region comprising a first and second rib, wherein the first and second ribs are separated by a first groove;

at least one tie-bar element disposed within the first groove, wherein the tie-bar element has first and second opposed sidewalls separated by a radially extending groove, wherein the tie bar element has a radially inner portion wherein the first and second opposed sidewalls are spaced apart at a constant width, and wherein the tie bar element has a radially outer portion wherein the first and second opposed sidewalls are continuously tapered so that the radially extending groove narrows from the radially inner portion to an upper surface of the tread.

* * * * *